(12) United States Patent
Hibbard

(10) Patent No.: US 8,657,582 B2
(45) Date of Patent: Feb. 25, 2014

(54) LIGHTNING PROTECTION MESH

(75) Inventor: Paul Hibbard, Putney (GB)

(73) Assignee: Vestas Wind Systems A/S, Aarhus N. (DK)

( * ) Notice: Subject to any disclaimer, the term of this patent is extended or adjusted under 35 U.S.C. 154(b) by 864 days.

(21) Appl. No.: 12/824,902

(22) Filed: Jun. 28, 2010

(65) Prior Publication Data

US 2010/0329865 A1    Dec. 30, 2010

Related U.S. Application Data

(60) Provisional application No. 61/221,131, filed on Jun. 29, 2009.

(30) Foreign Application Priority Data

Jun. 29, 2009    (EP) ..................................... 09163982

(51) Int. Cl.
*F01D 25/00* (2006.01)

(52) U.S. Cl.
USPC ..................................... 416/229 R; 416/230

(58) Field of Classification Search
USPC ................ 416/62, 229 R, 230, 247 R, 146 R; 244/1 A; 361/218
See application file for complete search history.

(56) References Cited

U.S. PATENT DOCUMENTS

| 7,883,321 B2 * | 2/2011 | Bertelsen ................... 416/146 R |
| 2008/0240925 A1 * | 10/2008 | Kita et al. ....................... 416/230 |

FOREIGN PATENT DOCUMENTS

| EP | 0 707 145 | 4/1996 | |
| EP | 0 718 495 | 6/1996 | |
| WO | WO 9001857 A1 * | 2/1990 | ................ H05F 3/00 |
| WO | 2008046186 | 4/2008 | |
| WO | 2008101506 | 8/2008 | |

OTHER PUBLICATIONS

Pavlos Avramidis; European Search Report and Written Opinion issued in EP priority application No. EP 09 16 3982; Feb. 4, 2010; 6 pages; European Patent Office.
Pavlos Avradimis; European Office Action and Search Report issued in related European Patent Application No. 09163982.3; Jan. 13, 2012; 7 pages; European Patent Office.

* cited by examiner

*Primary Examiner* — Dwayne J White
(74) *Attorney, Agent, or Firm* — Patterson & Sheridan, LLP

(57) ABSTRACT

A lightning protection mesh for a blade of a wind turbine comprising a first set of wires running in a first direction, and a second set of wires running in a second, different direction. The mesh has at least one tapered end at which wires from at least one of the first and second set of wires run together. The total conducting cross-sectional area formed by the wires in the tapered end is maintained within the tapered end, and the wires are bundled at the tapered end to provide an electrical connection to the mesh.

20 Claims, 4 Drawing Sheets

(12)  United States Patent US 8,657,582 B2

LIGHTNING PROTECTION MESH

CROSS-REFERENCE TO RELATED APPLICATIONS

This application claims priority under 35 U.S.C. §119(a) to EP Application No. EP09163982.3 filed Jun. 29, 2009. This application also claims the benefit of U.S. Provisional Application No. 61/221,131, filed Jun. 29, 2009. Each of these applications is incorporated by reference herein in its entirety.

TECHNICAL FIELD

The present invention relates to a lightning protection mesh, and, in particular, to a lightning protection mesh for a blade of a wind turbine, a blade with a lightning protection mesh and a wind turbine including at least one such blade.

BACKGROUND

Lightning protection is often provided to prevent structural parts of wind turbines from being damaged by lightning. For example, rotor blades containing weakly conductive material, such as carbon fibres, are prone to damage due to lightning strikes. Lightning strikes may cause high currents in such material which would thereby be excessively heated and, thus, damaged. It is therefore common to equip rotor blades with lightning protection installations, in particular lightning protection meshes.

For example, a wind turbine rotor blade with a lightning protection mesh is known from EP 0 718 495 A1. The mesh is apparently electrically connected to the hub of the wind turbine at several connection points.

Although a mesh of the sort shown in EP 0 718 495 A1 may provide satisfactory lightning protection, it is an object of the present invention to provide an improved lightning protection mesh, e.g., suitable to protect a wind turbine rotor blade.

SUMMARY

According to a first aspect, the invention provides a lightning protection mesh for a blade of a wind turbine comprising a first set of wires running in a first direction, and a second set of wires running in a second, different direction, each wire in each set of wires having a certain conducting cross-sectional area. The mesh has at least one tapered end comprising wires from at least one of the first and second set of wires. The total conducting cross-sectional area formed by the wires is maintained within the tapered end, and the wires are bundled at the tapered end to provide an electrical connection point to the mesh.

According to a second aspect, the invention provides a blade for a wind turbine comprising such a lightning protection mesh.

According to a third aspect, the invention provides a wind turbine comprising at least one such blade.

Further aspects of the invention are set forth in the dependent claims, the following description and the drawings.

BRIEF DESCRIPTION OF THE DRAWINGS

Embodiments of the present invention are explained by way of example with reference to the accompanying drawings, in which.

DETAILED DESCRIPTION

Figure 1:
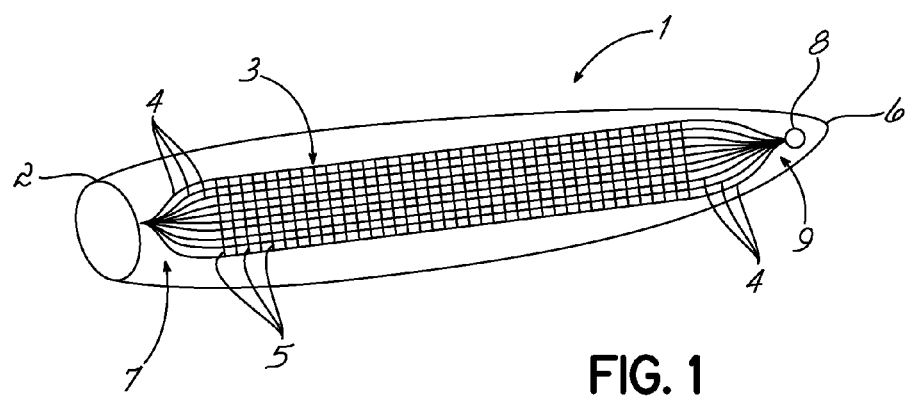
FIG. 1 schematically shows a blade with a lightning protection mesh in accordance with a first embodiment in which only the mesh's longitudinal wires are introduced into the tapered end.

FIG. 1 illustrates the first embodiment of the lightning protection mesh in which only the mesh's longitudinal wires are introduced into the tapered end. Before proceeding further with the detailed description of FIG. 1, however, a few general items will be discussed.

Wind turbines are tall structures and are therefore prone to lightning strikes. In particular, the rotor blades are often struck. Without lightning protection, a blade could be damaged by the high currents caused by lightning strikes. In particular, in blades containing weakly conducting carbon fibres, these currents may heat this material excessively. To prevent the blades from being damaged by lightning strikes, the blades in the embodiments are completely or partially covered by an electrically conducting mesh that is electrically connected to ground. Furthermore, in some embodiments a lightning receptor is provided at or near the blade tip; the receptor is electrically connected to ground by the mesh itself, or a by conductor electrically connected in parallel to the mesh and which runs inside the blade.

EP 0 718 495 A1, mentioned at the outset, pertains to lightning protection of wind turbine blades by conducting meshes. The meshes are connected to the rotor hub at connection points. The mesh width is reduced when approaching a connection point. As can be seen from FIG. 2 of EP 0 718 495 A1, the lateral longitudinal wires of the mesh in this reduced-width region do not extend to the connection point, but are cut.

It has been recognized by the present inventor that such a measure reduces the total cross-sectional area of the conductor formed by the mesh at the connection point in the main conduction direction, e.g. the longitudinal direction of the blade.

To avoid such a reduction of the total conductive cross-section one might think of bundling the mesh, without cutting any wires. However, to make such a bundle, the mesh would have to be folded. As a consequence, the wires transverse to the longitudinal wires would be bent and superimposed, resulting in a relatively thick end-piece formed by the mesh at the connection point.

By contrast, in the embodiments described, lightning protection meshes are provided in which the total conducting cross-sectional area formed by the wires in the tapered end is maintained (i.e. is not reduced) within the tapered end, and the wires are bundled at the tapered end to provide an electrical connection point to the mesh. The bundle may possibly include all the wires in the tapered end.

In addition, the wires in the tapered end are preferably not folded. As will be described in more detail below, this can be achieved in different alternative ways. For example, by gradually parallelising the wires along the tapered end, folding of wires to form the bundle can be avoided. Another exemplary alternative is to include only wires which run substantially in the longitudinal direction of the bundle, and to cut the wires which run substantially transverse to the longitudinal direction of the bundle.

To define the different orientations of mesh wires a generalized language is also used herein in which they are called "wires running in a first direction" and "wires running in second, different direction". It is also defined that wires from "at least one of the first and second set of wires" run together at a tapered end of the mesh, which means that the first and/or the second set wires run together. This language is used to cover different embodiments in which, for example, only the wires of one of the two directions are introduced into the tapered end, and other embodiments in which wires of both directions are introduced. Within the first-mentioned embodiments, either the longitudinal mesh wires or the transversal mesh wires may be introduced into the tapered end. Moreover, the "first and second directions" are not limited to longitudinal and to transversal directions, because in some embodiments the mesh wires are inclined relative to the longitudinal direction of the mesh and form rhomboid-shaped cells.

In some embodiments, the total conducting cross-section is maintained, in the absence of folding wires, by removing the mesh wires transverse to the tapered-end direction and introducing only mesh wires parallel the tapered-end direction into the tapered end. Since no wires parallel to the tapered-end direction are cut (and the cross-section of the individual wires parallel the tapered-end direction is constant) the total conductive cross-section is not reduced within the tapered end.

In other embodiments, the total conductive cross-section within the tapered end is maintained by including both the first and second wires in the formation of the tapered end. In these embodiments the wires are not oriented parallel and transversal to the longitudinal direction of the mesh, but are rather inclined relative to the longitudinal direction (e.g., at +45° and −45° relative to it). The mesh wires of both wire directions are used to form the tapered end by gradually parallelising the first and second wires along the tapered end for this purpose. Any folding of wires is rendered unnecessary by the parallelising of the wires of the two different directions.

In all embodiments, the wires forming the tapered ends may be finally superimposed to form bundles, but due to the absence of folding, these bundles will be relatively thin.

As mentioned above, in some embodiments, the first set of wires run basically in a longitudinal direction of the mesh and the second set of wires run basically in a second, different direction which may be transverse to the longitudinal direction. In embodiments in which the mesh is arranged to cover the surface of a wind turbine blade, the longitudinal direction may coincide with the blade's longitudinal axis.

In some of these embodiments, only the first (i.e. the longitudinal) set of wires run together at the tapered end(s), while the second set of wires are not included in the formation of tapered ends. To achieve this, for example, a margin at the transversal edge of the mesh is provided which is devoid of transversal wires and into which only the longitudinal wires extend. The longitudinal wires in the margin are gathered into one or more tapered ends to finally form bundles that can serve as electrical connection points.

In other embodiments, the roles of the first and second set of wires are interchanged: only second wires—which run basically in the transversal direction of the mesh—form the tapered end(s). Only the second set of wires are introduced into, and run together at, the tapered end(s), while the first (i.e. the horizontal) set of wires are not included in the formation of tapered ends. Since the total conducting cross-section of the mesh in the transversal direction will usually be greater than that in the longitudinal direction (since there are usually many more transversal wires than longitudinal wires, as the mesh length usually exceeds the mesh width) it will be sufficient to introduce only a fraction of the second wires into the tapered end(s).

In embodiments of this type it may be desirable to provide a constant total conducting cross-section along the blade into the tapered end(s). To achieve this, a corresponding fraction of the second set of wires is introduced into the tapered end(s) in some embodiments. For example, assume a mesh has 200 longitudinal and 4000 transversal wires, only 200 transversal wires are bundled to form a (single) tapered end, so as to achieve a constant total conducting cross-section (or only 100 transversal wires if one tapered end is formed at either lateral side of the mesh, as 100+100=200).

The (e.g. 200 or 100) transversal wires to be bundled are longer than the other transversal wires. Thus, since the mesh is typically to be connected (to a receptor, to ground or to another mesh) near a transversal edge of the mesh, there is a margin at the transversal edge from which the transversal wires extend in the transversal direction beyond the transversal edge. These extended longitudinal wires are concentrated/gathered into one or more tapered ends to finally form bundles that can serve as electrical connection points.

Forming the tapered ends, and thereby the electric mesh connectors, with the transverse wires (rather than the longitudinal wires) enables meshes to be arranged directly adjacently side-by-side, and to be electrically connected laterally, thereby avoiding any loopholes in the combined mesh thus formed. This is, for instance, useful when a mesh-protected blade is made of two or more segments, because the meshes can then extend up to the joint between the blade segments.

The arrangements described in connection with the longitudinal/transversal-wire embodiments may also be combined in one and the same mesh to form a sort of hybrid mesh; e.g. a first tapered end may be formed by using only the longitudinal wires and a second tapered end by using only the transverse wires.

As mentioned above, in other embodiments in which the first set of wires and the second set of wires are inclined relative to the longitudinal direction of the mesh, both the first and the second set of wires are introduced into the tapered end(s). In types of mesh of this kind, the crossing wires in the first and second set of wires form cells of a rhomboid-shaped structure. In a region where the mesh is relatively broad (e.g. because the blade covered is broad), the rhomboid angle in the longitudinally oriented edge of the rhomboids may be 45° or more. However, at the tapered end(s), the wires in the first and second set are parallelised, to eventually form a bundle of parallel wires. In other words, the rhomboid angle in the longitudinally oriented edge of the rhomboid decreases to about zero degrees within the tapered end. Eventually, the wires in the first and second set are parallelised, to form a bundle of parallel wires, meaning that the crossing angle at the tapered end approaches zero degree.

Typically, a wind turbine blade is tapered towards its tip, and sometimes also towards its root. As mentioned above, a mesh of the inclined-wires type is particularly suitable for adaptation to this variable-width shape, to cover the blade entirely. The adaptation is achieved by varying the inclination angle in the manner described above. Accordingly, the tapering of the mesh may also be made—besides the provision of electrical connection points to the mesh in the tip and/or the root region of the blade—to adapt the mesh to the blade's general shape.

Some descriptions are set forth to describe possible embodiments of such a mesh. For example, a variable-width mesh could be made up of wires at an angle to the roll direction (the nominal starting angle might be +/−45° degrees to the roll direction, i.e. 90° to each other). By changing the angle of the principal wire directions, i.e. the angles between the wires in the first and second set of wires, it could be possible to make the mesh wider, for example, by increasing the angle between the wires towards 180°, or make the mesh roll width narrower by bringing the angle between the principal wire directions towards zero.

The shearing between the principal wire directions could be done locally along the blade length, i.e. the mesh roll width could be constant for most of the blade length but increased at the root or maximum chord area, or could be used to taper the mesh roll width down at the tip end. This is advantageous in avoiding having to cut or fold the mesh as the tip gets narrower.

It could also be possible to vary the angle between the principal wire directions all the way along the blade to match the blade chord.

In order for the mesh to be made wider at certain locations, the nominal starting angle could for example be +/−30° so that if wires would not become too steep at certain locations. For example, at an angle of +/−80° the wires will be running mostly across the blade and this may not be optimum for bringing the lightning current down the blade toward the root.

This shearing of the wires relative to each other could also be done if the mesh was woven together. It would also work if the crossover points of the wires are welded together, the mechanism for this roll shearing in the welded case would probably be some bending of the wires close to the crossover weld points.

Forming tapered ends in a lightning protection mesh is mainly determined by two functions (alternatively or in combination): (i) providing a suitable electrical connection point, or points; (ii) adapting the mesh's shape to a substrate (e.g. a wind turbine blade) that has a tapered shape.

With regard to function (i), the wire bundle formed may be equipped with a conductive sleeve (and, e.g., a cable shoe, or the like) to facilitate connection of the mesh to a ground conductor, a lightning receptor, or another mesh. As mentioned, a mesh may be equipped with a plurality of tapered ends to provide several connection points that are connected in parallel, e.g. to a lightning receptor or ground conductor.

In another embodiment, the wire bundle formed may comprise the wires forming a circular shape when viewed at a cross-section of the bundle. This allows the easy equipping of a conductive sleeve onto the wire bundle. The wires could all be in parallel to one another, or they could be twisted, to form the bundle. Alternatively, the wire bundle could comprise the wires being laid side-by-side to one another and in the same plane as the mesh. This allows better encompassing by composites which are layered onto the mesh in the production of the wind turbine blade. The gathered flat strands thereafter provide a connection to the rest of the lightning protection system, either directly, or with a conductive sleeve.

As to function (ii), adapting the mesh shape to the blade shape is not always desired. For example, there are types of blades that are composite structures in which the leading and/or trailing edge portions are made of an insulating material, while only the blade's central portion is made of a weakly conducting material. Embodiments of meshes adapted to those blades cover the weakly conducting material of the central portion entirely, but do not cover the isolating edge portion(s), apart from an (optional) overlap at the borderline between the weakly conducting and the isolating materials. As the isolating part of such a composite blade is not usually struck by lightning, meshes with a constant width equal to, or slightly larger than, the width of the weakly conducting central portion provide sufficient protection. However, with other blade structures (entirely isolating, or entirely weakly conducting), it may be appropriate to have meshes adapted to the blade shape and covering the entire blade surface.

The definition that the total cross-sectional area is maintained along a tapered end does not necessarily imply that the total cross-sectional area of the mesh along the longitudinal direction is constant along the blade and is equal to the cross-section in the tapered end (or the sum of the cross-sections along the tapered ends forming parallel connecting points, if there is more than one tapered end to form parallel connecting points). For example, in embodiments with longitudinally and transversally oriented wires and a mesh with a varying width, longitudinal mesh wires may be cut to adapt the mesh to the varying width.

By contrast, in other embodiments, the total conductive cross-sectional area of the mesh, including the tapered ends, is maintained for a net current flowing in the blade's longitudinal direction. For example, in a mesh in which the first set of wires are parallel to the blade's longitudinal direction said net current will only flow through the first set of wires. When, in these embodiments, the mesh has a constant width (meaning that the number of first wires is constant along the mesh), and all wires in the first set of wires are introduced into the tapered end, i.e. no wires in the first set are cut, the cross-sectional area of the mesh, including its tapered ends, is constant for a net current flowing in the blade's longitudinal direction.

The same feature can even be achieved with a mesh of variable width of the above-mentioned type with inclined wire angles (relative to the longitudinal direction), in which the wire angle is greater where the mesh is broader, and smaller where it is narrower. In such a mesh, there are no longitudinal wires that take up all the longitudinal net current (except at the tapered ends) and no transversal wires that take up no longitudinal net current. Rather all the current flowing to traverse the mesh longitudinally must actually flow through the inclined wires (of course, in a mesh of this type, the current has to leave those wires which terminate at the lateral edge of the mesh and has to change over to crossing wires of the other direction). As the number of wires in any transversal cross-section is constant in a mesh of this type, irrespective of the mesh width (only the wire angle and the wire distance varies with the mesh width, but not the number of wires), the total cross-sectional area for a current traversing the mesh in the longitudinal direction is constant, irrespective of the mesh width. Eventually, in those embodiments of this type in which all the wires terminating at the transversal edge of the mesh are introduced into the tapered end(s) at that edge, the total cross-sectional area for a longitudinal net current is constant along the blade, including the tapered ends.

Usually, the receptors at the blade tips are grounded via a lightning conductor that runs down inside the blade. In some embodiments, however, the mesh (if only one side of the blade is mesh-protected), or the meshes on either side of the blade (if both sides are protected), act(s) as a lightning conductor from the lightning receptor to the rotor hub, thereby replacing the conventional lightning conductor from the receptor to the hub inside the blade. In these embodiments, no further lightning conductor running inside the blade is provided. Thus, the mesh has a double function: (i) blade protection, and (ii) providing the section of the ground connector between the receptor and the hub.

In some embodiments, the first and second sets of wires are woven to form the mesh. In other embodiments the first set of wires form a first layer and the second wires form a second layer, the layers being superimposed. In both cases, the wires may or may not be connected (e.g. bonding or welding) at their crossing points (if they are not connected, electrical connection between the crossing wires can only be provided by wire contact).

Some embodiments pertain to special blade designs in which the blade is sub-divided in two or more segments, e.g. a radially inner segment and a radially outer segment. The segments may be prefabricated and only assembled at the wind turbine's construction site. In some embodiments, prefabrication of the segments includes equipping then with a lightning protection mesh covering the respective segment (over its full width or only a partial width, as described above). At the interface where the two prefabricated segments are to be connected, the mesh segments are equipped with one or more tapered ends that form electrical connection points, to enable the mesh-protected blade to be assembled on site.

A wind turbine equipped with the lightning protection meshes described herein typically has a ground connector to which the meshes are electrically connected. It may, for example, start at the blade root, bridge rotatable bearings (e.g. the pitch bearings, the rotor bearing, the nacelle bearing) by means of sliding contacts or spark gaps, run down the tower, and are grounded. As described above, the meshes may be connected to lightning receptors, at the blade tips. In some embodiments, the mesh provides the (only) electrical connection of the receptor to ground, while in other embodiments a separate lightning conductor (e.g. a cable) running inside the blade is connected in parallel to the mesh.

Figure 2:
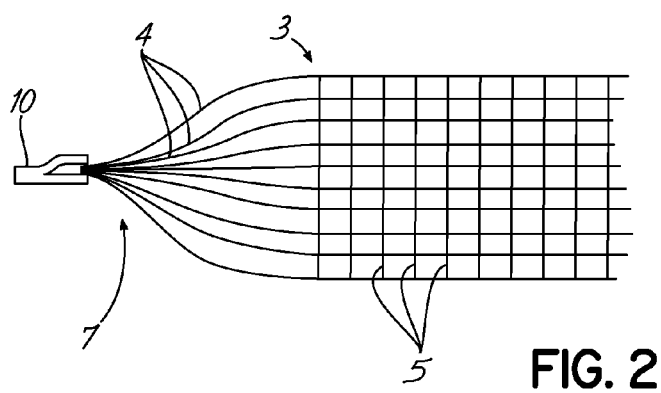
FIG. 2 schematically shows an end-portion of the lightning protection mesh of FIG. 1 in more detail.

FIGS. 1 and 2

First Embodiment

Returning to FIGS. 1 and 2, a wind turbine blade 1 with a blade root 2 and a blade tip 6 is equipped, at the surface of a central portion of the width of the blade 1, with a lightning protection mesh 3 (the other side of the blade 1 not visible in the figures may also be arranged with another mesh in an analogous manner). As can be seen in FIGS. 1 and 2, only a central portion of the width of the blade 1 is covered by the mesh 3 since the mesh 3 has a constant width along its regular middle part, while the blade 1 is wider in its middle part than towards the root 2 and tip 6.

The mesh 3 is made up of an arrangement of electrically conducting wires 4, 5. It is regularly formed in the mesh's middle part by an arrangement of equidistant wires 4 running in a first direction, here the mesh's longitudinal direction, called "longitudinal wires", and another arrangement of equidistant wires 5 running in a second direction, here the mesh's transversal direction, called "transversal wires" (only some of which have a pointer to their reference signs in FIGS. 1 and 2). The longitudinal wires 4 cross the transversal wires 5 perpendicularly, and are electrically connected to them at the crossing points.

The mesh's longitudinal direction coincides with what is called hereinafter the longitudinal direction of the blade 1. The blade's longitudinal direction is, approximately, the blade's long extension (depending on the specific blade design, it may, for example, be parallel to the line connecting the centre of the root 2 and the tip 6). The blade's transverse direction is transverse to the longitudinal direction.

For aerodynamic reasons, the blade 1 has a smooth surface. The mesh 3 is therefore not arranged on the surface of the blade 1, but is directly below the even blade surface. The surface itself may be made of isolating material because, due to the high voltages involved, a thin isolator is presents no barrier for lightning; lightning will only "see" the conducting, grounded mesh directly below the isolating blade surface.

At the margins of the mesh 3, near the transversal edges towards the root 2 and the tip 6, the wire arrangement is different from the regular arrangement in the mesh's middle part: there are no transversal wires in the margins, but there are only the longitudinal wires 4. It is possible to produce such a mesh without transversal wires in the margins from the outset; alternatively, the mesh can initially be produced as a completely regular mesh, the transversal wires being removed from the margins in a later production step).

The distance between the longitudinal wires 4 is continuously reduced in the margins, so that the longitudinal wires run together, thereby forming tapered ends 7, 9 each at the ends of the mesh 3 towards the root 2 and the tip 6 respectively. The tapering finally results in a compact bundle of parallel longitudinal wires 4. The wire bundle may be embraced by a conductive sleeve. The sleeve, or the wire bundle without a sleeve, is inserted in a connector 10 (FIG. 2) to provide an electrical connection to a conductor to ground, or a lightning receptor 8 near the blade tip 6.

Owing to the absence of transversal wires in the tapered ends 7, 9, the reduction of the distance between the longitudinal wires 5 does not result in any transversal wires being folded. The longitudinal wires are finally superimposed in the bundle, but are not folded either.

Since no wires are cut in the tapered ends 7, 9, the total conductive cross-section is maintained within the tapered ends 7, 9. Since, in the embodiment of FIGS. 1 and 2, all the longitudinal wires 5 extending along the mesh 3 are introduced in the tapered ends 7, 9, the total conductive cross-section of the longitudinal wires along the mesh 3 is maintained within the tapered ends 7, 9, and is finally led to the connectors 10.

Moreover, since none of the longitudinal wires 4 is cut, and all current must flow through the longitudinal wires 4, the total conductive cross-section of the mesh for a net current flowing in the blade's longitudinal direction is constant all along the mesh 3, including the tapered ends 7, 9.

FIG. 3

Second Embodiment

Figure 3:
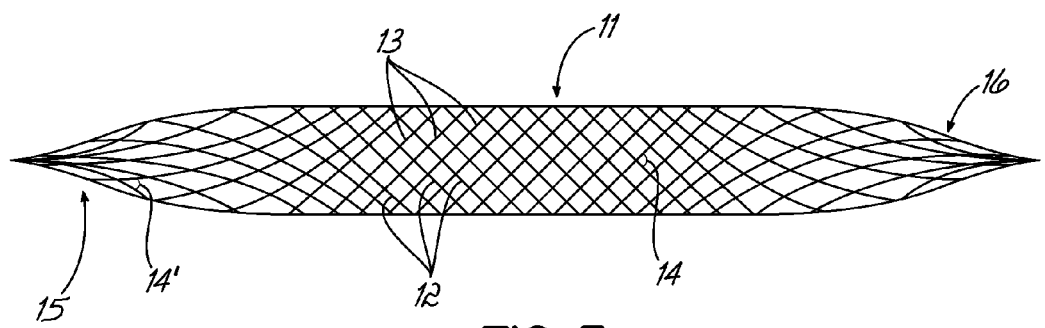
FIG. 3 schematically illustrates a lightning protection mesh in accordance with a second embodiment, in which both first and second wires are introduced into tapered ends with a continuously decreasing mesh angle.

In the alternative embodiment of a lightning protection mesh 11 of FIG. 3, the first and second wires (here: 12 and 13) are, in the regular middle part of the mesh 11, not oriented parallel and transversal, but at an inclined angle relative to the blade's longitudinal direction, for example at +45° and −45° relative to the longitudinal direction. In the example shown, the crossing first and second wires 12, 13 thus form rhomboid-shaped cells with a relatively large rhomboid angle 14 in the longitudinally oriented edge of the rhomboids (here the rhomboid angle 14 in the regular middle part of the mesh 11 is 90°).

A mesh 11 of this type is adaptable to different widths by varying the rhomboid angle. It is therefore particularly suitable for covering rotor blades with a varying width completely. This adaptability also enables the mesh width to be reduced to a compact bundle, by parallelising first and second wires 12, 13, to provide an electrical connection point.

In FIG. 3, the width of the mesh 11 gradually decreases towards the mesh ends, forming tapered ends 15, 16. In the regions forming the tapered ends, the wires are curved towards the longitudinal direction, so that the rhomboids become elongated and the rhomboid angles 14' (in the longitudinally oriented edges) of the rhomboids gradually decrease. Strictly speaking, due to the curvature of the wires the cells formed by the crossing wires are not precise rhomboids any more; but as they are similar, the terms "rhomboid", "rhomboid angle", etc. are still used to refer to these cells (in FIG. 3, the deviation from real rhomboids is shown in exaggerated form). Finally, the wires 12, 13, are completely parallel and form a compact wire bundle, or strand, to enable the mesh 11 to be connected, e.g. to a ground connector and a lightning receptor.

Owing to the gradual parallelisation, no wires need to be folded to form the tapered ends 15, 16 resulting in the wire bundles.

As all the wires 12, 13 forming the mesh 11 and ending at the transversal edge of the mesh 11 are introduced into the tapered ends 15, 16 and are led through the tapered ends into the final wire bundles, the total conductive cross-section is maintained within the tapered ends 7, 9.

Moreover, since none of the wires ending at the transversal edge of the mesh 11 is cut to form the tapered ends, and all current must flow through the inclined wires 12, 13, the total conductive cross-section of the mesh for a net current flowing in the blade's longitudinal direction is constant all along the mesh 11, irrespective of the local mesh width.

Other issues described in the context of FIGS. 1 and 2, but not mentioned here, also apply to the embodiment of FIG. 3, if as appropriate.

FIG. 4

Third Embodiment

Figure 4:
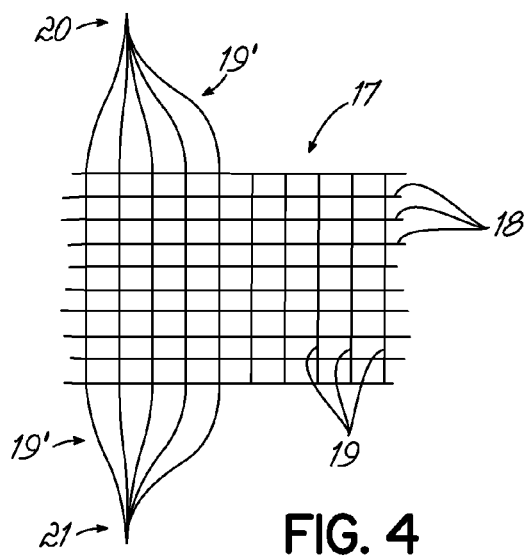
FIG. 4 schematically illustrates a lightning protection mesh in accordance with a third embodiment similar to the first embodiment in which, however, only wires running in the transverse direction of the mesh are introduced into the tapered ends.

FIG. 4 shows another alternative embodiment of a mesh 17. It has longitudinal wires (here: "18") and transversal wires (here: "19") and is therefore similar to that of FIGS. 1 and 2.

However, what is different is that the tapered end which provides an electrical connection point is not formed by bundling longitudinal wires, but only transversal wires 19' (as will be explained below, not all the transversal wires 19 are bundled—the ones that are bundled are denoted by 19'). In the embodiment shown, two such tapered ends 20, 21 are formed, at either lateral side of the mesh 17 at the mesh's end portion near its transversal edge (in FIG. 4, only one such end portion is shown; at the other end, the mesh 17 has another end portion that may have further tapered ends).

To enable tapering and bundling of transversal wires without affecting (in particular: without folding) the mesh 17 or any of its longitudinal wires 18, the transversal wires 19' to be bundled are elongated so that they extend beyond either lateral edge of the regular part of the mesh 17.

The outwardly extending elongated transversal wires 19' run together to form tapered ends 20, 21, and finally wire bundles, in order to provide electrical connection points. The position of these connection points is lateral to the mesh 17.

The region where the elongated transversal wires 19' extend outwardly and form the tapered ends 20, 21 is devoid of any longitudinal wires. Thus, in order to form the tapered ends 20, 21, and finally the wire bundles, no wires are folded.

Since no wires are cut in the tapered ends 20, 21, the total conductive cross-section is maintained within the tapered ends 20, 21.

Furthermore, in some embodiments, the total conductive cross-section of both tapered ends corresponds to the total conductive cross-section of the longitudinal wires 18 in the regular middle part of the mesh 17. For example, assuming that the single-wire cross-sections of the longitudinal and transversal wires 17, 18 are identical, the number of longitudinal wires 17 (which is ten in the schematic FIG. 4) corresponds to the number of the transversal elongated wires 19' forming a tapered end 20, 21 (which is five in FIG. 4) times the number of tapered ends 20, 21 that form electrically parallel connection points (which is two in FIG. 4). In such embodiments, the total conductive cross-section of the longitudinal wires along the mesh 17 is maintained by the transverse wires 19' (through which all the current flows), is further maintained within the tapered ends 20, 21 and is finally led to connectors.

Other issues described in the context of other figures, but not mentioned here, also apply to the embodiment of FIG. 4.

FIG. 5

Application of the Third Embodiment to a Segmented Blade

Figure 5:
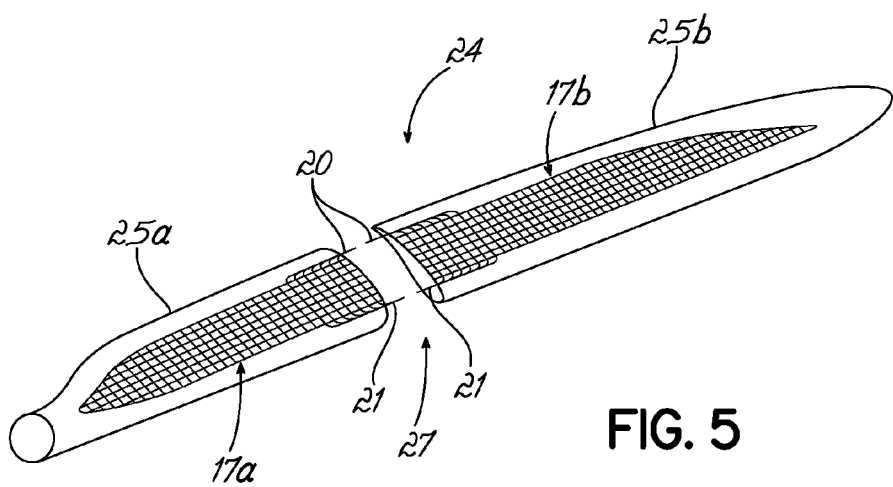
FIG. 5 schematically shows two segments of a blade each equipped with a lightning protection mesh of the third embodiment, the two meshes being electrically connected with each other at their tapered ends.

A segmented blade 24 according to FIG. 5 is made of several prefabricated segments, for example, of an inner blade segment 25a and an outer blade segment 25b. The segments 25a, 25b are arranged to be mechanically connected at a midspan joint 27. In the example shown, the dividing line between the segments 25a, 25b runs in the transverse direction. The embodiment of the mesh shown in FIG. 3 enables such a segmented blade 24 to be mesh-protected, without forming a significant mesh gap at the interface (i.e. the midspan joint 27) between the segments 25a, 25b.

The blade 24 is covered with a mesh 17 formed by two mesh segments 17a, 17b. Upon prefabrication, the blade segments 25a, 25b are already equipped with a corresponding mesh segment 17a, 17b. When the blade 24 is assembled on site, the mesh segments 17a, 17b are simply interconnected electrically.

To provide for the electrical interconnection, the mesh segments 17a, 17b are designed according to the mesh 17 of FIG. 4. More specifically, the mesh segments 17a, 17b are equipped with lateral tapered ends 20, 21 arranged at the interface 27 between the blade segments 25a, 25b. The mesh segments 17a, 17b extend (with their regular wire arrangement) close to the dividing line between the blade segments 25a, 25b, so that the two meshes together cover the assembled blade 24 nearly continuously, without forming a significant mesh gap 27 at the interface. This gap-less coverage is facilitated by the lateral arrangement the tapered ends 20, 21 since this arrangement requires no space in the central portion of the width of the blade 24.

The tapered ends 20, 21 are equipped with complementary electrical connectors so that, upon blade assembly, the mesh segments 17a, 17b on the blade segments 25a, 25b can be electrically joined.

Regarding the other sides of the mesh segments 17a, 17b towards the blade root 2 and/or the blade tip 2, the mesh segments 17a, 17b can be designed, e.g., like the mesh 1 of FIGS. 1 and 2 with tapered ends using the longitudinal wires.

FIG. 6

Coverage of Conductive Parts of Blade Structure by Mesh

Figure 6:
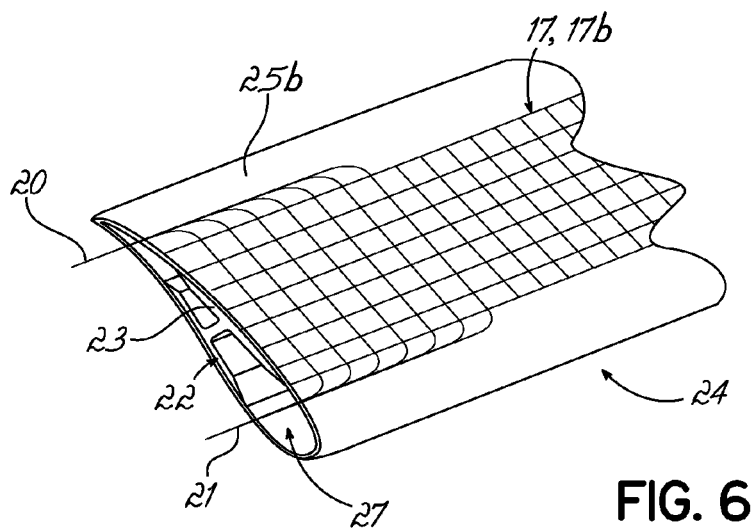
FIG. 6 is a perspective view into a blade segment of FIG. 5 with a weakly conducting structure to illustrate partial mesh-coverage of a rotor blade.

A view inside the blade segment 25b at the interface 27 between the two segments 25a, 25b is provided by FIG. 6. A spar 22 extends longitudinally through the blade segment 25b to provide longitudinal stability to the blade 24. The spar 22 has a spar cap 23 at or below the blade surface, each at the pressure side and the suction side of the blade 24. The spar caps 23 on the pressure and suction sides are linked by a web. In the transverse direction, the spar caps 23 only extend over a central portion of the width of the blade 24 (not the entire width).

The spar 22 is made of an electrically weakly conducting material, such as carbon-fibre, while the leading and trailing edge regions of the blade 24 are made of electrically isolating material, such as glass fibre reinforced plastics.

The mesh 17 is adapted to cover the weakly conducting material and also to provide a small overlap over the adjacent isolating material, i.e. its width corresponds to, or is slightly larger than, that of the width of the weakly conducting structure (e.g. the spar cap 23). The leading and trailing edge regions made of isolating material are not mesh-covered (apart from the overlap). Although this partial mesh-coverage is illustrated in connection with the embodiment of FIG. 5, it is likewise applicable to all the other embodiments described herein.

In FIG. 6 (and the other figures) the mesh 17 is only shown at one side (here: the suction side) of the blade 24. However, generally also the other side of a blade will be covered with a lightning-protection mesh, as described, and thereby also be protected against lightning strikes.

As shown in FIG. 6, no further lightning conductor connected in parallel to the mesh(es) 17 runs inside the blade 24.

FIG. 7

Variant of First Embodiment with Multiple Tapered Ends

While in the embodiment of FIGS. 1 and 2 all longitudinal wires are introduced in a single tapered end to form a single connection point, alternatively, smaller groups of longitudinal wires can be formed, and the wires of each of these smaller group can be introduced in a separate tapered end to provide a plurality of bundles/electrical connection points at the same side of the mesh.

Figure 7:
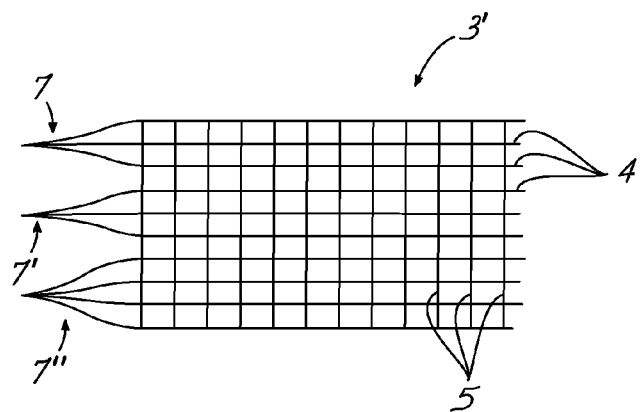
FIG. 7 schematically illustrates a lightning protection mesh in accordance with a fourth embodiment of the present invention, in which the mesh's longitudinal wires are introduced in multiple tapered ends.

For example, in FIG. 7—which illustrates only one transversal-edge region of a mesh, denoted here by 3'—the longitudinal wires 4 are subdivided into three groups, each group forming its own tapered end 7, 7', 7".

As in FIGS. 1 and 2, since no wires are cut in the tapered ends 7, 7', 7", the total conductive cross-section of the wires of a group is maintained within the tapered ends 7, 7', 7". The cumulated conductive cross-section of all the tapered ends 7, 7', 7" corresponds to the total cross section of all the longitudinal wires 5. Since, in the embodiment shown, all the longitudinal wires 5 extending along the mesh 3 are introduced in the tapered ends 7, 7', 7", the total conductive cross-section of the longitudinal wires along the mesh 3' is maintained within the tapered ends 7, 7', 7". A conductor with the same total cross-section may lead out from the mesh 3', if the tapered ends 7, 7', 7" are electrically connected in parallel e.g. to a ground connector, a receptor or another mesh.

Other issues described in the context of other figures, but not mentioned here, also apply to the embodiment of FIG. 7.

FIG. 8

Application of the Embodiment of FIG. 7 to a Segmented Blade

The segmented blade 24 of FIG. 5 may alternatively be equipped with meshes 3' of FIG. 7 with multiple tapered ends 7, 7', 7". The mesh segments are here denoted by 3a' and 3b'. Since this way of bundling mesh wires requires some space in the central portion of the width of the blade 24, the coverage obtained at the interface (midspan joint 27) between the segments 25a, 25b is not as regular as in FIG. 5. In principle, one could also connect the meshes of blade segments with a single tapered end, such as in FIGS. 1 and 2. However, the embodiment 3' with multiple tapered ends 7, 7', 7" provides a better coverage of the interface region, since the uncovered areas between a plurality of tapered ends 7, 7', 7" is smaller than the area that would be left uncovered if there were only one tapered end.

Figure 8:
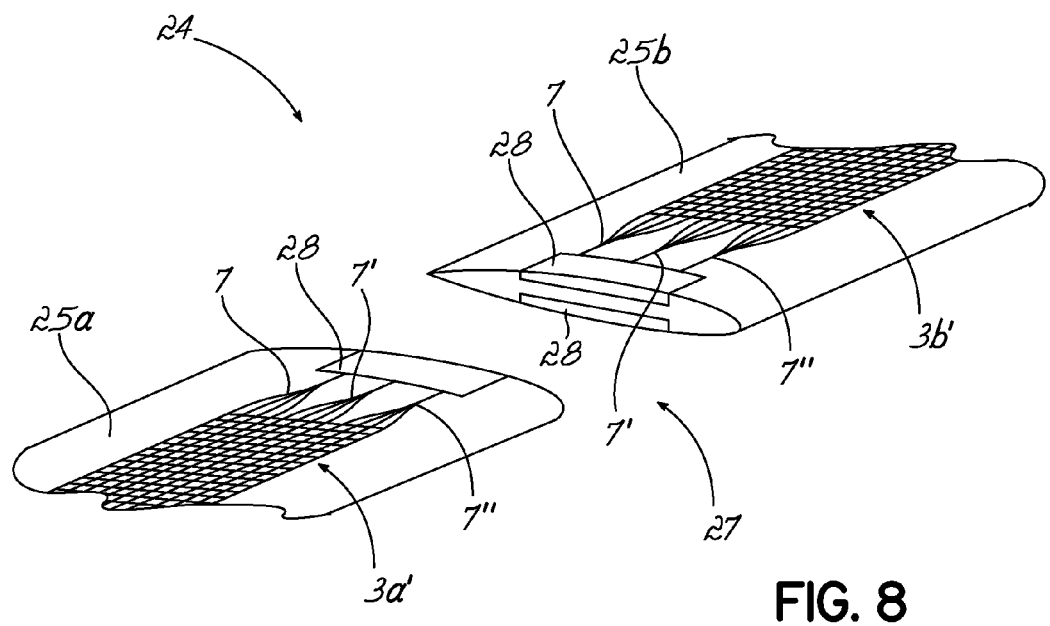
FIG. 8 schematically shows two parts of a blade each with the lightning protection mesh of the fourth embodiment, the multiple tapered ends being electrically connected to a connection strip at the interface between the two blade parts.

A conductive contact strip 28 is arranged on each of the segments 25a, 25b at the interface 27 between them. If there is a mesh 3' at the pressure side and another mesh 3' at the suction side of the blade 24, there may be two corresponding contact strips 28 on either side, as indicated in FIG. 8. The contact strips 28 have an L-shaped cross section. One leg of the "L", called the "surface leg", is mounted on the blade surface that also carries the segment mesh 3a', 3b'. The multiple tapered ends 7, 7', 7" at the blade surface are electrically connected to the surface leg (e.g. by soldering, crimping, etc.). The other leg, called the "interface leg", is arranged at the front face of its respective segment 25a, 25b. When the blade 24 is assembled, the interfaces at the two segments 25a, 25b will come into electrical contact, or they will at least form a small gap. Functionally, such a gap will present no barrier because lightning current is able to spark over such small gaps, due to the high voltages involved.

FIG. 9

Wind Turbine with Mesh-Protected Blades

Figure 9:
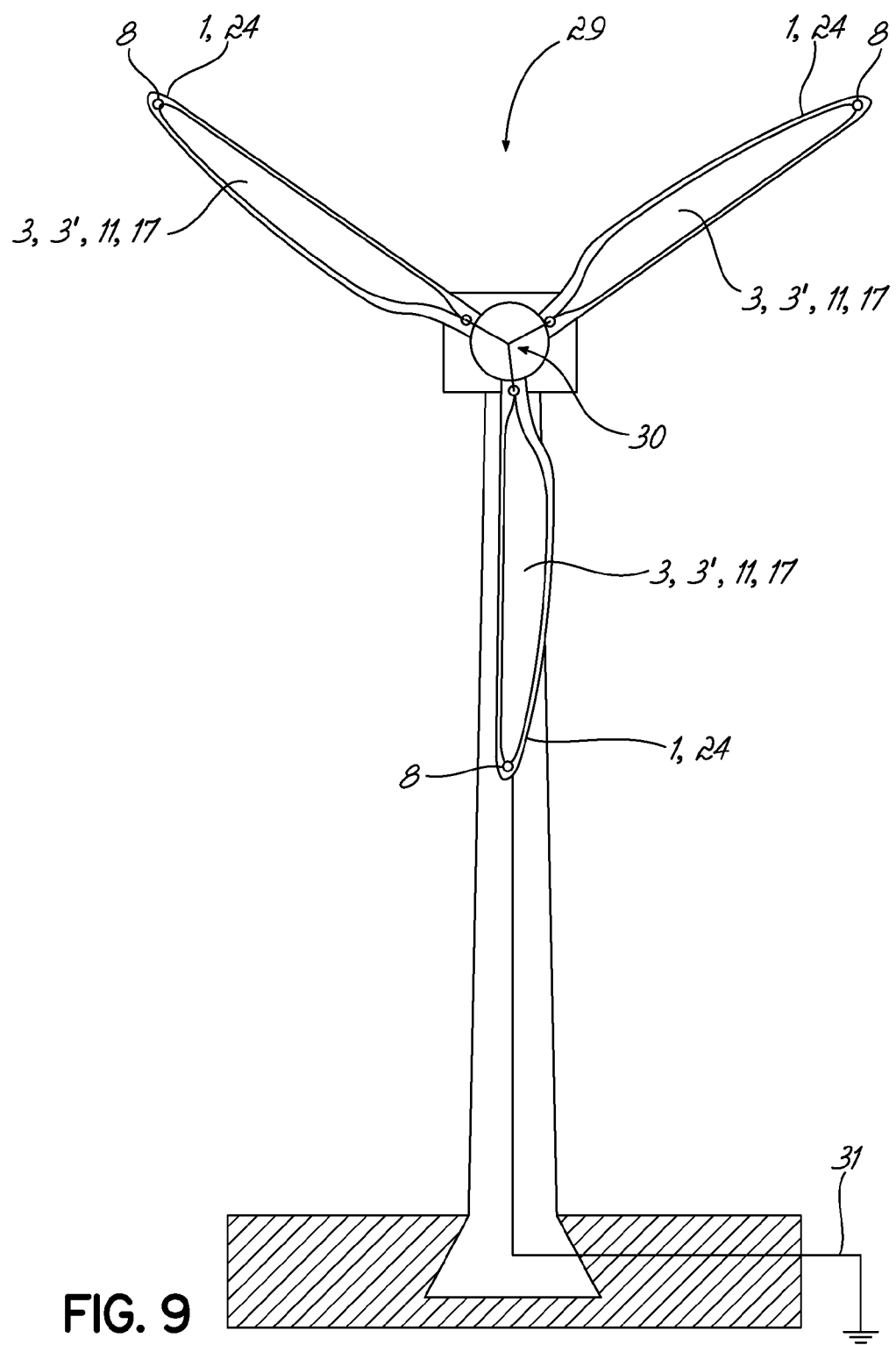
FIG. 9 schematically shows an embodiment of a wind turbine equipped with a lightning protection installation including lightning protection meshes of any of the embodiments described.

The wind turbine 29 of FIG. 9 has blades 1 (FIG. 1), optionally segmented blades 24 (FIGS. 5, 7), protected at the pressure and the suction sides of the blades 1, 24 by any of the meshes 3, 3" 11, 17 described so far. The blades 1, 24 are mounted on a hub 30. Lightning receptors 8 are arranged at the blade tips. A lightning conductor 31 passes from the blade roots through the hub 30, the wind turbine's nacelle and tower to the ground and is earthed there. Rotatable bearings on the path to ground (i.e. bearings between blade and hub, hub and nacelle, nacelle and tower) are bridged e.g. by sliding contacts and/or spark gaps.

The meshes 3, 3" 11, 17 are connected through their tapered ends 7, 7', 7", 9, 15, 16, 20, 21 to the lightning receptors 8 and the lightning conductor 31, respectively. The meshes on the pressure and suction sides of the blade are connected in parallel. They also act as a lightning conductor from the lightning receptor (8) to the ground conductor (31) along the blade (1, 24). There is no further lightning conductor running inside the blade 1, 24.

What is claimed is:

1. A lightning protection mesh for a blade of a wind turbine, comprising:
   a first set of wires running in a first direction, and
   a second set of wires running in a second, different direction, each wire in each set of wires having a certain conducting cross-sectional area,
   wherein the mesh comprises at least one tapered end comprising wires from at least one of the first and second set of wires,
   wherein the wires are bundled at the tapered end to provide an electrical connection point to the mesh, and
   wherein the total conducting cross-sectional area formed by the at least one of the first and second set of wires is maintained within the tapered end.

2. A lightning protection mesh according to claim 1, wherein all the wires in the tapered end are included in the bundle.

3. A lightning protection mesh according to claim 1, wherein the wires in the tapered end are not folded.

4. The lightning protection mesh according to claim 1, wherein the first set of wires run substantially in a longitudinal direction of the mesh and the second set of wires run substantially in a transversal direction of the mesh.

5. The lightning protection mesh according to claim 3, wherein the first set of wires run together at the at least one tapered end, while the second set of wires are not included in the formation of the tapered end.

6. The lightning protection mesh according to claim 3, wherein the second set of wires run together at the at least one tapered end, while the first set of wires are not included in the formation of the tapered end.

7. The lightning protection mesh according to claim 1, wherein both the first set of wires and the second set of wires are inclined relative to the longitudinal direction of the mesh, wherein the inclination angle decreases along the tapered end.

8. The lightning protection mesh according to claim 1, wherein the first set of wires and the second set of wires are inclined relative to the longitudinal direction of the mesh, and wherein both the first and second set of wires are included in the formation of the at least one tapered end, the first and second set of wires being gradually parallelised along the tapered end for this purpose.

9. The lightning protection mesh according claim 8, wherein the first and second set of wires run at a relative angle to each other, said angle decreasing to about zero degrees along the tapered end.

10. The lightning protection mesh according to claim 1, wherein the wires in the bundle are laid side-by-side to provide an electrical connection point to the mesh.

11. The lightning protection mesh according to claim 1, wherein the first and/or the second set of wires run together in multiple tapered ends.

12. The lightning mesh according to claim 1, wherein intersection between the wires in the first and second set of wires produces an angle, and the angle is varied along the blade.

13. A blade for a wind turbine comprising a lightning protection mesh comprising:
   a first set of wires running in a first direction, and
   a second set of wires running in a second, different direction, each wire in each set of wires having a certain conducting cross-sectional area,
   wherein the mesh comprises at least one tapered end comprising wires from at least one of the first and second set of wires,
   wherein the wires are bundled at the tapered end to provide an electrical connection point to the mesh, and
   wherein the total conducting cross-sectional area formed by the at least one of the first and second set of wires is maintained within the tapered end.

14. The blade according to claim 13, wherein the at least one tapered end of the lightning protection mesh is connected to a lightning receptor.

15. The blade according to claim 13, wherein the at least one tapered end of the lightning protection mesh is connected to a lightning ground conductor.

16. The blade according to claim 14, wherein the mesh also acts as a lightning conductor from the lightning receptor to the ground conductor, without a further lightning conductor being connected in parallel.

17. The blade according to claim 13, wherein the blade is a composite structure with a central portion made of weakly conducting material and at least one edge portion made of isolating material, wherein the mesh covers the weakly conducting material of the central portion, but does not cover the at least one isolating edge portion, apart from an overlap at the borderline between the weakly conducting and the isolating material.

18. The blade according to claim 13, the blade comprising two sides, each side of the blade comprising a lightning protection mesh.

19. The blade according to claim 13, comprising two or more lightning protection meshes, wherein a first lighting protection mesh is positioned in a first segment of the blade and a second lightning protection mesh is positioned in a second segment of the blade, and wherein tapered ends of the first and second lightning protection meshes are electrically connected to each other.

20. A wind turbine comprising at least one blade comprising at least one lightning protection mesh, the at least one lightning protection mesh comprising
   a first set of wires running in a first direction, and
   a second set of wires running in a second, different direction, each wire in each set of wires having a certain conducting cross-sectional area,
   wherein the mesh comprises at least one tapered end comprising wires from at least one of the first and second set of wires,
   wherein the wires are bundled at the tapered end to provide an electrical connection point to the mesh, and
   wherein the total conducting cross-sectional area formed by the at least one of the first and second set of wires is maintained within the tapered end.

\* \* \* \* \*